US007010436B2

(12) United States Patent
Larsson et al.

(10) Patent No.: US 7,010,436 B2
(45) Date of Patent: Mar. 7, 2006

(54) METHOD AND DEVICE FOR PREDICTION OF A ZERO-CROSSING ALTERNATING CURRENT

(75) Inventors: Per Larsson, Vastersas (SE); Magnus Backman, Vasteras (SE); Lars Jonsson, Vasteras (SE)

(73) Assignee: ABB Group Services Center AB, Vasteras (SE)

( * ) Notice: Subject to any disclaimer, the term of this patent is extended or adjusted under 35 U.S.C. 154(b) by 0 days.

(21) Appl. No.: 10/297,402

(22) PCT Filed: Jun. 7, 2001

(86) PCT No.: PCT/SE01/01263

§ 371 (c)(1), (2), (4) Date: Jun. 4, 2003

(87) PCT Pub. No.: WO01/95354

PCT Pub. Date: Dec. 13, 2001

(65) Prior Publication Data

US 2004/0090719 A1 May 13, 2004

(30) Foreign Application Priority Data

Jun. 7, 2001 (SE) .................................... 0002125

(51) Int. Cl.
*G06F 19/00* (2006.01)
*G05F 1/10* (2006.01)

(52) U.S. Cl. .......................... 702/57; 324/86; 323/235; 323/319; 702/58

(58) Field of Classification Search .................. 702/57, 702/58, 59, 60, 79; 361/2, 93, 42, 47, 65, 361/88, 93.1; 324/86; 323/235, 319
See application file for complete search history.

(56) References Cited

U.S. PATENT DOCUMENTS

| | | | | |
|---|---|---|---|---|
| 4,754,360 | A * | 6/1988 | Nakada | 361/8 |
| 4,959,558 | A * | 9/1990 | Kay et al. | 327/78 |
| 5,510,591 | A * | 4/1996 | Tremblay et al. | 218/43 |
| 5,563,459 | A * | 10/1996 | Kurosawa et al. | 307/141.4 |
| 5,793,594 | A * | 8/1998 | Niemira et al. | 361/93.2 |
| 5,804,991 | A * | 9/1998 | Hu | 327/162 |
| 6,597,999 | B1 * | 7/2003 | Sinha et al. | 702/64 |
| 2003/0067723 | A1 * | 4/2003 | Suzui et al. | 361/42 |
| 2003/0202303 | A1 * | 10/2003 | Parker | 361/93.1 |
| 2004/0090720 | A1 * | 5/2004 | Larsson et al. | 361/2 |

FOREIGN PATENT DOCUMENTS

| | | |
|---|---|---|
| WO | 0137298 A1 | 5/2001 |
| WO | 0137300 A1 | 5/2001 |

* cited by examiner

*Primary Examiner*—Patrick J. Assouad
(74) *Attorney, Agent, or Firm*—Dykema Gossett PLLC

(57) ABSTRACT

An apparatus (14) for detecting a zero-crossing of an alternating current after occurrence of a fault in a current path (2) for determining a suitable time for opening an electric switching device (2) arranged in the current path for breaking the current in the current path comprises members (15) adapted to detect the current in the current path. An arrangement (19) is adapted to calculate the dc-level of the current and the decay of the dc-level with time on the basis of values of the alternating current detected and also predict the time for a future zero-crossing of the alternating current on the basis of at least current values obtained through said current detection, the dc-level calculated, the dc-decay calculated and information about the period time of the alternating current.

64 Claims, 5 Drawing Sheets

METHOD AND DEVICE FOR PREDICTION OF A ZERO-CROSSING ALTERNATING CURRENT

FIELD OF THE INVENTION AND PRIOR ART

The present invention relates to an apparatus for predicting a zero-crossing of an alternating current after occurrence of a fault current in a current path for determining the suitable time for opening an electric switching device arranged in the current path for breaking the current in the current path as well as a method for such a prediction.

"Electric switching device" is to be given a broad sense and covers not only such ones having a mechanical movement between different parts for obtaining an opening through physical separation of two parts in the current path, but also semiconductor devices, such as IGBTs or the like, which open by going to blocking state and by that breaking the current therethrough. "Electric switching device" also comprises so called transfer switches through which then a current in a current path may be broken upon occurrence of a fault current in the current path for switching in another current path instead to a load or the like.

It has within the electricity field been a long felt need of apparatuses and methods of this type. When such a fault current occurs, it is important that the electric switching device on one hand opens the current path, i.e. breaks the current, as soon as possible for not damaging different types of equipment connected to the current path, but it is on the other absolutely necessary that the alternating current changes direction, i.e. has a zero-crossing, before it is broken. However, the alternating current receives upon occurrence of said fault usually a direct current component (dc-component), the magnitude of which depends upon the time for occurrence of the fault, and this dc-component is superposed on the alternating current, which in the worst case may result in a duration of several periods of the alternating current before any zero-crossing occurs. For this sake, it has until now after occurrence of a fault simply been waited so long that a breaking definitely may be made in connection with a zero-crossing of an alternating current, in which it is assumed that the fault may have occurred at the most unfavourable time with respect to the dc-component. This long waiting means of course an imminent risk of greater damage on said equipment than would the breaking have taken place at an earlier time. The breaking will for this procedure of breaking the alternating current of course in most cases take place after the occurrence of a plurality of zero-crossings, since there has to be a considerable safety margin for not breaking to early.

It would therefor be desired to break the alternating current considerably earlier exactly when this is possible, i.e. predict a zero-crossing of the alternating current in the individual case so as to be able to obtain a breaking at an optimum time. It is for that sake not sure that it is always desired to break the current when the first zero-crossing occurs, since the dc-component may still be that great that the energy of an arc generated on a contact location would be to high and the amount of material burned away would be to large, so that the breaker or switching device may be partially destroyed or fail.

Another reason for desires of predicting a zero-crossing is in a switching device with breaking through contact separation the existence of the mechanical delay time interval of the contact system of such a switching device, which necessitates a start of the mechanic movement a certain period of time before the zero-crossing so that the breaking may take place at the zero-crossing.

It is pointed out that the invention is applicable to opening of current paths provided with all types of electric switching devices, since it is interesting to obtain a well controlled arcing time in the breaking chamber for conventional breakers through a said prediction, but the invention is particularly directed to so called hybrid breakers of the type described in the Swedish patent application 9904164-2 still unpublished of the applicant. In such a hybrid breaker having two branches connected in parallel in the current path, one in the regular current path through the switching device with a commutator, and one with a part having ability to block current therethrough in at least one blocking direction and conduct current therethrough in at least one direction, and a breaking contact member connected in series with said part, it is of great interest to be able to control the contact opening of the commutator to the zero-crossing of the alternating current for avoiding an arc. Since said part has to block for enabling an opening of the contact member without any current, when using parts in the form of rectifying diodes it is a condition that the commutator is not opened until a zero-crossing of the alternating current may be obtained. The corresponding problems are applicable to the hybrid breaker described in the Swedish patent application 9904166-7 still unpublished and owned by the applicant. Thus, there may both be a desire to predict a zero-crossing for being sure that a breaking really may take place and for determining the optimum time for the breaking, for example synchronise the breaking with the predicted time for a zero-crossing.

SUMMARY OF THE INVENTION

The object of the present invention is to provide an apparatus and a method of the type defined in the introduction, which make it possible to predict an early zero-crossing of an alternating current with a good exactness after occurrence of a fault current in a current path.

This object is according to the invention obtained by providing an apparatus of said type with members adapted to detect the current in the current path, an arrangement adapted to calculate the dc-level of the current, i.e. the displacement of the symmetry line of the alternating current with respect to the zero level thereof, and the decay of the dc-level with the time on the basis of values of the alternating current detected by said members, and said arrangement is adapted to predict the time for a future zero-crossing of the alternating current on the basis of at least the current values obtained through said current detection, the calculated dc-level, the calculated dc-decay and information about the period time of the alternating current, as well as a method according to the appended independent method claim.

The apparatus according to the invention designed in that way enables a reliable prediction of a future zero-crossing, since a future zero-crossing is calculated on the basis of said current values detected while considering both the dc-level of the alternating current and how rapidly it falls. It gets by this possible to control a breaker so that the mechanical movement of a contact member is started a certain period of time before a future zero-crossing for obtaining breaking exactly at the zero-crossing, would there be a desire thereof. There is neither any risk of making any attempt to break before any zero-crossing has occurred, since this is first predicted.

It is pointed out that although the apparatus is there for predicting a zero-crossing upon occurrence of a fault, such as a short circuiting, in a current path and is arranged for this sake, it may of course also be used for optimising the breaking of the current in the current path at normal load current, since it is there in anyway.

According to a preferred embodiment of the invention said current detecting members are adapted to detect the time for a zero-crossing of the current, and the arrangement is adapted to consider the time for a detected zero-crossing when predicting a time for a future zero-crossing of the alternating current. By firstly detecting a zero-crossing in this way and starting from this time when calculating a future zero-crossing the prediction of a future zero-crossing will be reliable.

According to a preferred embodiment of the invention said members adapted to detect the alternating current after occurrence of said fault current during a period of time of at least one period of the alternating current, and the arrangement is adapted to use current values resulting through detection of the alternating current during this period of time for calculating said dc-decay. By detecting the alternating current during at least one period the possible influences of harmonics upon the appearance of the alternating current and by that the possible influence thereof upon the time for predicted zero-crossings may be eliminated. The harmonics occurring during a whole period will namely be the same as those occurring during the next whole period and they will by that not influence the times for the predicted zero-crossings, thus, the prediction will be nearly insensitive to harmonics.

According to another preferred embodiment of the invention the apparatus comprises means adapted to integrate the alternating current detected by said members over a first and a second period of time of the same length as the first one and being substantially a period of the alternating current, and said arrangement is adapted to form the quotient of these two current integration values and utilise this for calculating said dc-decay. This constitutes a reliable way to calculate the dc-decay. It is pointed out that the second period of time starts after the first one, but 35 that the two may very well partially overlap each other.

According to another preferred embodiment of the invention the apparatus comprises members adapted to calculate the differential coefficient of the alternating current of the zero-crossing detected through information received from said current detection members, and the arrangement is adapted to use this differential coefficient value when calculating a future zero-crossing of the alternating current. The differential coefficient is then preferably determined on the basis of values of the alternating current detected closely before and closely after said zero-crossing.

According to another preferred embodiment of the invention the current detecting members are adapted to deliver the value of the alternating current of two consecutive current peaks to said arrangement, and the arrangement is adapted to form an average of these two current values for use as said dc-level when calculating said future zero-crossing of the alternating current. The dc-level may in this way easily be determined with the accuracy aimed at.

According to another preferred embodiment of the invention the apparatus is designed for an alternating current in the form of a three-phase alternating current, the arrangement is adapted to calculate the dc-level for two phases by determining an average of two consecutive current peaks of the respective phase, and the arrangement is adapted to calculate the decay with time of the dc-level on the basis of the relation between these two dc-levels and then use it when predicting a future zero-crossing. The dc-decay may in this way at three-phase faults be very rapidly calculated and a condition for an early prediction of a future zero-crossing of the alternating current is by that fulfilled.

According to another preferred embodiment of the invention the apparatus comprises also members adapted to calculate the ac-decay of the alternating current, i.e. the reduction of the amplitude of the alternating current with the time, on the basis of current values delivered by said current detecting members, which further improves the accuracy of the prediction, but it may require a longer time for calculation of the time for a future zero-crossing.

According to another preferred embodiment of the invention the detecting members are adapted to sample the value of the alternating current with a sampling frequency during at least a whole current period and a memory member is adapted to store the values sampled, and the arrangement is adapted to calculate the dc-level at a given time by forming the average of the current values stored for the period of time of a current period backwardly from said time and then use this dc-level in said prediction. It may then advantageously be assumed that the decay of the dc-level is exponential and the arrangement may be adapted to calculate the time constant thereof by dividing the dc-level obtained through division by the time differential coefficient thereof. This forms the basis for a possibility to predict a future zero-crossing of the alternating current without first having to detect any zero-crossing. More exactly, according to another preferred embodiment of the invention the arrangement is adapted to predict the dc-level at a future time on the basis of the dc-level and the decay of dc-level with the time calculated for said given time, and the arrangement is adapted to predict the value of the alternating current by subtracting, from the value of the alternating current measured a current period before the time last mentioned, the difference between the calculated dc-level a current period before the future time and the predicted dc-level of the current at said future time. By means of the current predicted in this way future zero-crossings thereof may be searched in different ways, for example by utilising the method of halve an interval.

According to another preferred embodiment of the invention said detecting members are adapted to detect the time for a peak value of the alternating current, and the arrangement is adapted to use this time as a reference for predicting future zero-crossings of the alternating current. A future zero-crossing may by this be predicted very early, and more exactly this may in a further development of this embodiment take place by the fact that the arrangement of such an apparatus also is adapted to predict the time for the zero-crossing of the alternating current following next to said peak value by adding ¼ of a current period and a first correction factor to the peak value time, and it is adapted to form said correction factor by a product of a constant d and $$\left(1 - \frac{imax}{dimax}\right),$$

in which d is the part of the dc-level that remains after half a current period, imax said peak value of the current and dimax the peak value of a standardised differential coefficient of the current during the half period directly before the time for the peak value of the current, in which a standardisation is so selected that imax and dimax get the same numerical values when the current is a pure sine function.

According to another preferred embodiment of the invention the apparatus is adapted to carry out a prediction of the zero-crossing of the alternating current in an electric switching device comprising two branches connected in parallel in the current path, in which the first of them comprises a first contact member having two contacts movable with respect to each other for opening and closing and the second comprises a part with ability to block current therethrough in at least a blocking direction and conduct current therethrough in at least one direction, in which a second contact member having two contacts movable with respect to each other for opening and closing is connected in series with said part, and in which the switching device also comprises a unit adapted to control opening of said current path on the basis of said prediction by controlling the first contact member to open for transferring the current to said part when this is in or going into a conducting state and then the second contact member to open when said part is in a state of blocking current therethrough for breaking the current through the switching device. The apparatus according to the invention is particularly advantageous in connection with such an electric switching device, since it allows a contact opening of the first contact member at the zero-crossing of the current for avoiding an arc, whereupon the second contact member then may be opened when said part is in a blocking state, which in the case of a rectifying diode is after the next zero-crossing. This is also valid for an apparatus according to the appended claim 51, which relates to prediction of the zero-crossing of the alternating current in an electric switching device of the type described in the Swedish patent application 9904166-7 of the applicant still not available to the public. It is pointed out that it is important to "predict" or in advance determine the direction of the current for the predicted zero-crossing. This may be done in different ways, such as by determining the differential coefficient of the current at a given moment, detect a current peak value and so on.

According to another preferred embodiment of the invention the apparatus is designed for predicting a zero-crossing of an alternating current in the form of a multiple phase alternating current, in which a separately controllable electric switching device is arranged in said current path for the respective phase. According to the invention the arrangement is in this case adapted to calculate said future zero-crossing of the alternating current individually for each phase of the alternating current for individually for each switching device determining a suitable time for opening of exactly that switching device. It gets by this possible to obtain a breaking of the alternating current for each individual phase exactly when this is most suitable for the phase in question, and it gets also possible to co-ordinate the breaking of the alternating currents of the different phases with each other should there be a desire thereof. This means a very great improvement with respect to the way to proceed used so far, in which all phases have been broken simultaneously or with a certain fixed phase shift, after a delay resulting in a possibility to state with certainty that zero-crossings occur for all phases.

The phases may through the invention instead b broken at different times depending upon the dc-components they contain. It gets also possible to determine the order of the breaking of the phases depending upon the current values delivered by the current detecting members.

According to a preferred embodiment of the invention the apparatus comprises means adapted to cooperate with an electrically controlled driving member adapted to obtain said opening of the electric switching device, and it is particularly advantageous if this driving member is an electromagnetic machine in the form of an electric motor. By using such a driving member it gets possible to very accurately control the movement of a movable part of the electric switching device for achieving said breaking and for example ensure that a separation of two contacts takes place in a very particular phase position of the alternating current. It may by this be taken full advantage of the prediction of a zero-crossing of the alternating current according to the invention. By the fact that said means for cooperation comprises a control unit in the form of an electronic unit adapted to control said driving member it is also possible to influence a movement of the movable part of the electric switching device when this has already started for making adaptions to possibly new predicted values of the zero-crossing. A co-ordination of an opening of the switching device with such a prediction may by that take place at a high accuracy.

The invention also relates to a device, a computer program and a computer program product according to the corresponding appended claims. It is easily understood that the method according to the invention defined in the appended set of method claims is well suited to be carried out through program instructions from a processor that may be influenced by a computer program provided with the program steps in question. Although not explicitly explained in the claims, the invention comprises such devices, computer programs and computer program products combined with a method according to any of the appended method claims.

Further advantages as well as advantageous features of the invention appear from the following description and the other dependent claims.

BRIEF DESCRIPTION OF THE DRAWINGS

With reference to the appended drawings, below follows a description of preferred embodiments of the invention cited as examples.

In the drawings.

DETAILED DESCRIPTION OF PREFERRED EMBODIMENTS OF THE INVENTION

Figure 1:
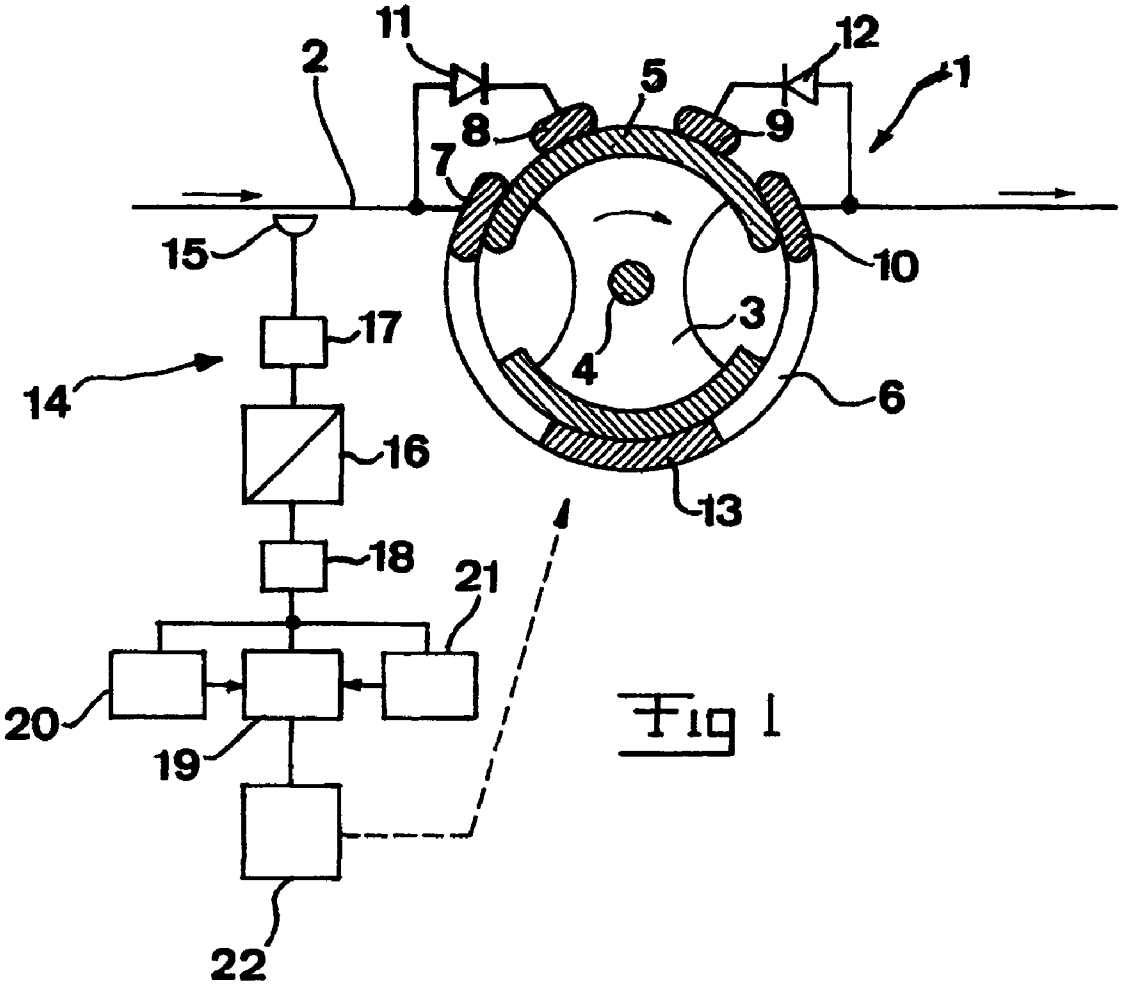
FIG. 1–3 are simplified views illustrating an apparatus for predicting a zero-crossing of an alternating current according to a preferred embodiment of the invention applied to a first type of switching device.

An electric switching device for alternating current of the type to which the invention is particularly well applicable is schematically illustrated in FIG. 1, namely a such that is described in the Swedish patent application 9904164-2 mentioned before, and which here is provided with an apparatus for predicting a zero-crossing of an alternating current according to a preferred embodiment of the invention. The electric switching device 1 is connected in a current path 2 so as to be able to rapidly open or close this and by that break and establish, respectively, the current in the current path. One such switching device is arranged per phase, so that a three phase network has three such switching devices on one and the same location. The switching device has an inner cylinder 3, which may be rotated around an axle 4 and has a movable contact part 5. A second cylinder 6 is arranged externally of the cylinder 3 and has four contacts 7–10 arranged along the movement path of the movable part 5 and to form good electric contacts when bearing against the movable part 5. The switching device is connected in the current path through the two outer contacts 7 and 10, respectively.

A semiconductor device in the form of a diode 11, 12 having the conducting direction from the outer to the adjacent contact is connected between the two outer contacts and the next adjacent inner contact. The diodes may just as well both be directed with the conducting direction towards the outer contact.

The switching device has also a driving arrangement adapted to drive the inner cylinder 3 to rotate for movement of the movable contact part 5 with respect to the other contacts 7–10. The driving arrangement is in this case constituted by an integrated electric motor 13 schematically indicated, which may be of many different types.

An apparatus 14 for predicting a zero-crossing of the alternating current in the current path 2 is connected to the switching device. This apparatus has members 15 schematically indicated adapted to detect the current in the current path by detecting the direction and the magnitude thereof and by that also detect the time for a zero-crossing of the current. The detecting members are adapted to send signals with information about the current furtheron to an analogues/digital converter 16 for converting the analogues signals to digital signals. Filters 17, 18 are arranged in the signal path before and after the converter for filtrating out noise signals, especially high frequency noise signals, from the signals from the detecting members 15. The current information is sent further to an arrangement 19 adapted to make a calculation of the time for one or more future zero-crossings of the alternating current on the basis thereof. Furthermore, means 20 adapted to integrate the alternating current detected by the detecting members 15 over a first and a second period of time being just as long as the first one and substantially a current period are connected to the arrangement and adapted to send this information further to the arrangement 19, which is adapted to form the quotient of these two current integration values and utilise this time for calculation of the dc-decay of the alternating current, i.e. the development of the dc-component of the alternating current over time.

The apparatus has also members 21 adapted to calculate the differential coefficient of the alternating current at a zero-crossing detected through information from the current detecting members 15 and send this information further to the arrangement 19, which is adapted to use this differential coefficient value when calculating the time for a future zero-crossing.

The arrangement 19 is also adapted to calculate the dc-level of the alternating current at a given time, such as at a zero-crossing detected, on the basis of the signals from the current detecting members 15, and the arrangement may preferably make this by forming an average of the alternating current for two consecutive current peaks and consider this constituting said dc-level.

When the arrangement has in this way predicted a future zero-crossing it will send control signals to a control unit 22 adapted to control the motor 13 and by that the movement of the movable contact part 5 for obtaining a breaking procedure adapted to the time for the predicted zero-crossing. A number of other conditions are also considered and a coordinating with other phases takes place before the motor 13 is started. The control unit 22 is here constituted by an electronic unit adapted to control an electrically controllable driving member 13 in the form of an electric motor and drive the movable part 5 to rotate around the axle 4. By using such an electrically controllable driving member in the form of an electric motor and an electronic unit for co-ordination therewith, the movement of the movable part 5 may be controlled very accurately and adjusted or interrupted as long as it continues.

The function of a switching device of the type illustrated appears more in detail from the Swedish patent application mentioned above but it will here be briefly summarised: when a desire of breaking a current in the current path 2 is born, for example by the fact that the detecting members 15 detect a very high current in the current path 2, which may be caused by a short circuiting therealong, it will then be possible for obtaining the quickest possible breaking to detect the direction of the alternating current and make the rotation direction of the cylinder 3 and by that the movable contact part 5 depending thereupon, but a very high accuracy at the very breaking is given priority with respect to the highest possible speed in the present invention. In the closed position according to FIG. 1 the entire current through the switching device flows between the two outer contacts 7, 10 through the movable part 5 interconnecting them galvanically. We assume that a decision has been taken to carry out the breaking by rotating the inner cylinder 3 clockwise as seen FIG. 1, and this shall then preferably be made so that an opening of the contact member formed by the contacts 7 and 8 is carried out at a zero-crossing of the alternating current, so that this may take place without forming any arc. It shall then take place when the diodes are going to be forward biased, so that the current will then be switched over to the diode 11 instead.

Figure 3:
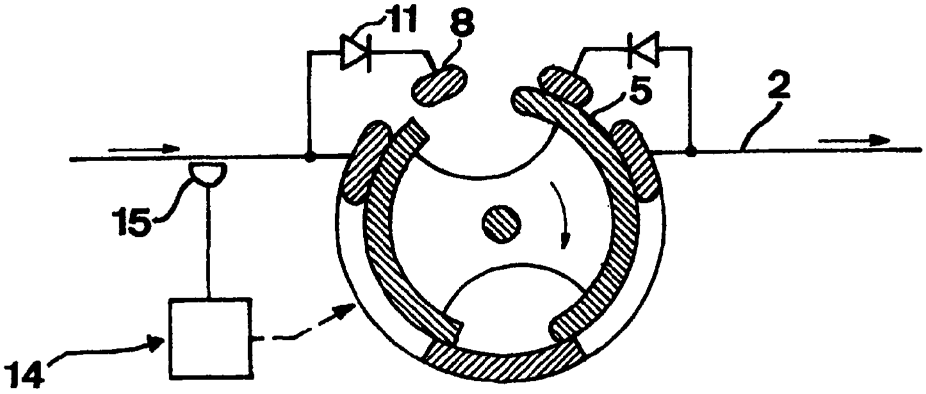

When the voltage over the switching device changes direction no current will flow therethrough, but a voltage will be built up across the diode 11 then reverse biased and the rotation movement of the movable contact part 5 is now continued in the same direction as before, so that the galvanic connection between the contact 8 and the contact 10 is broken, in which this breaking may take place without any arcing, since no current flows through the contact place at the breaking instant. The entirely open position in FIG. 3 is then obtained by that.

Figure 4:
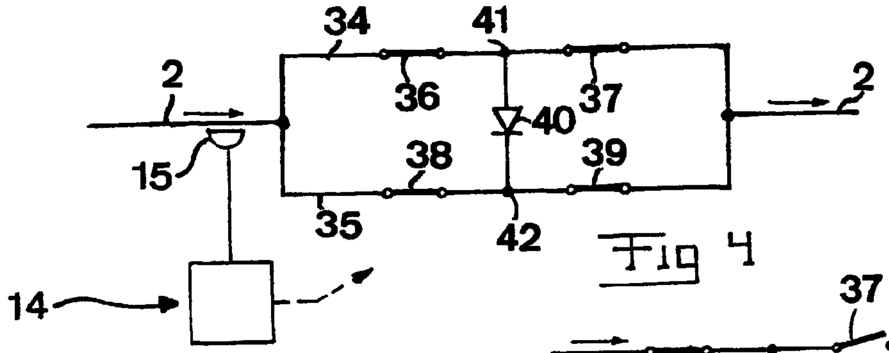
FIG. 4–6 are views corresponding to FIG. 1–3 of an apparatus according to the invention applied to a second type of switching device.

The general construction of an electric switching device according the Swedish patent application 9904166-7 mentioned above is schematically illustrated in FIG. 4 and this device is connected in a current path 2 for being able to rapidly open and close it. One such switching device is arranged per phase, so that a three phase network has three such switching devices on one and the same location. The switching device comprises two branches 34, 35 connected in parallel in the current path and each having at least two mechanical contact members 36–39 connected in series. A semiconductor device 40 in the form of a diode is adapted to connect the midpoints 41, 42 between the two contact members of each branch with each other.

Figure 2:
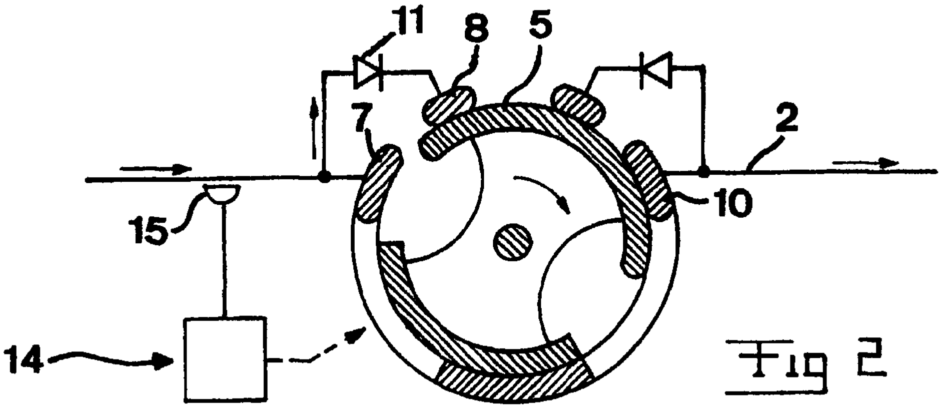

An apparatus 14 according the invention for controlling or operating the electric switching device is connected thereto and the construction thereof is the same as described above for the embodiment according to FIGS. 1–3.

Figure 5:
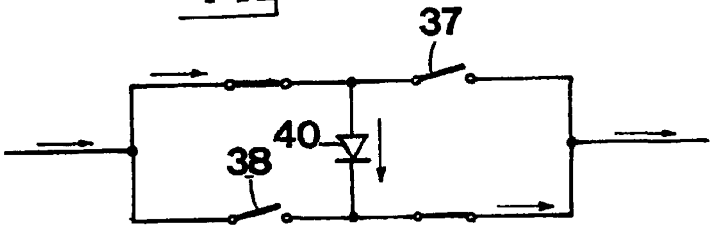
Figure 6:
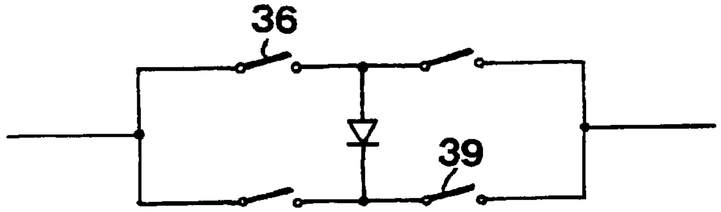

The function of this electric switching device is as follows: when there is a desire of breaking the current in the current path 2, for example by the fact that the detecting member 15 detects a very high current in the current path, which may be caused by a short circuiting therealong, it is determined in the way described above through the result of the detection when it is most suitable to break the current through the respective electric switching device. Once it has been determined that a given electric switching device shall be opened, the control unit 22 takes first a decision of which two contact members, here the contact members 37 and 38 (se FIG. 5), are to be opened for establishing a temporary current path through the semiconductor device 39. Thus, this decision depends upon in which position the current in the current path is at that moment. In the position according to FIG. 4 the entire current through the switching device flows through the two branches 34, 35 and nothing through the diode. When now breaking shall take place, the current shall as quick as possible be transferred to flow through the diode instead. The current may be switched into the diode from a certain direction during that part of an alternating current period that is located between the time just before the diode gets forward biased in that direction and the time when the diode gets reverse biased next time. This means for a whole period of 20 ms in the practise that an opening of the contact members according to FIG. 5 may take place for example about 2 ms before zero-crossing towards a forward conducting direction until the next zero-crossing. When the wrong half period of the alternating voltage for an opening of the contact members 37 and 38 according to this premises exists, the contact members 36 and 39 may instead be immediately opened for establishing that temporary current path instead. Accordingly, this temporary current path is established immediately after detecting a need of and possibility to open the switching device for closing the current therethrough. When the temporarily closed position illustrated in FIG. 5 is obtained through opening the contact members 37, 38 a small spark is formed in the gap between the contacts of the respective contact member, which results in a voltage of usually 12–15 V, which will drive the transfer of the current through the diode 40. When then the current through the switching device changes direction no current will flow therethrough, but a voltage will be built up across the diode 40 then reverse biased, and at least one of the two other contact members 36, 39 are opened now, so that the temporarily current path is opened, in which this opening may take place without any arcing, since no current flows through the contact place at the instant of opening. The completely open position of the switching device shown in FIG. 6 is by that obtained, in which the current therethrough is permanently broken. It is in this terminating opening important that it takes place so quick that the voltage over the diode 40 has not changed direction again and this starts to conduct. The utilising of the same semiconductor device in the temporary current path independently of in which direction the current flows through the switching device makes great savings of costs possible by a substantially reduced number of semiconductor devices with respect to switching devices of this type already known.

The apparatus according to the invention has the object to predict a future zero-crossing or several future zero-crossings of the alternating current for obtaining the breaking procedure according to above being an optimum with respect to the location thereof on the time scale. How this is intended to take place in the practise will now be explained with reference to FIGS. 7 and 8, which illustrate the development of the alternating current I over the time t after a short circuiting along said current path.

Figure 7:
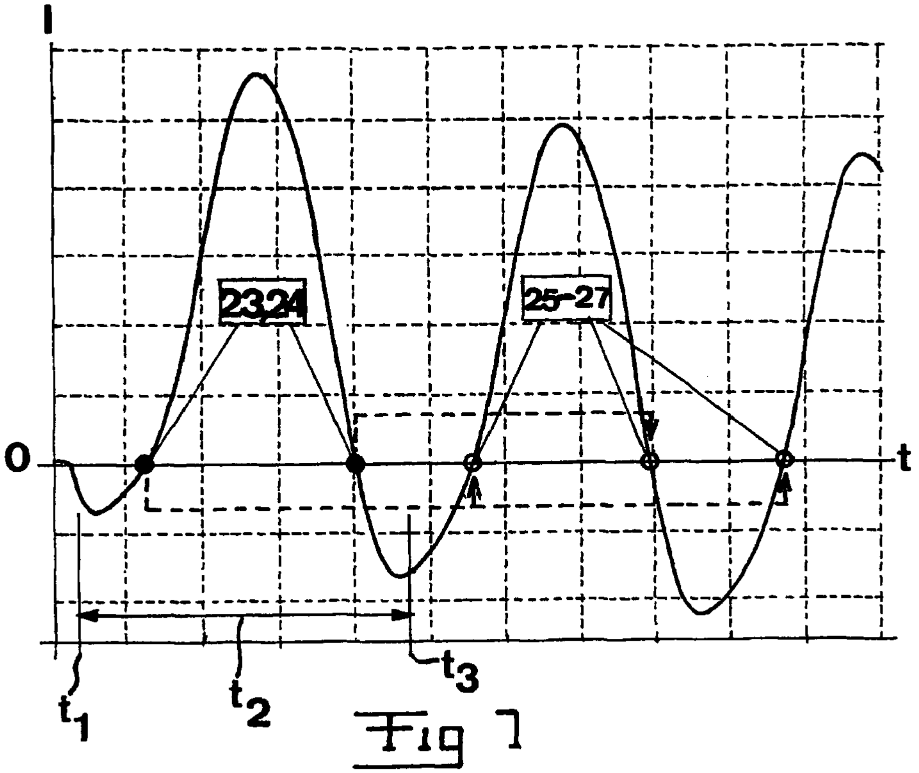
FIG. 7 illustrates schematically how a method for predicting zero-crossings according to a first embodiment of the invention is carried out.

It is illustrated in FIG. 7 how the alterating current of one phase develops after occurrence of a short circuiting of said current path at the time $t_1$. It appears by comparing the symmetry line of the alternating current with the line for a zero current that the alternating current receives a considerable direct current component with a decay over time. This means that the distance between consecutive zero-crossings also varies with time, and it is neither so that each second zero-crossing, i.e. a zero-crossing after one period, is located a time period of the alternating current after each other, i.e. in the case of 50 Hz 20 ms.

During a period of time $t_2$ of a good whole period of the alternating current, i.e. somewhat more than 20 ms, after the short circuiting detected the value of the alternating current is detected and registered, in which two zero-crossings 23, 24 are detected. A first prediction of future zero-crossings 25–27 is then made at the time $t_3$. The predictions of the zero-crossings 25 and 27 are made on the basis of the zero-crossing 23 measured and the prediction of the zero-crossing 26 on the basis of the measured zero-crossing 24. By basing the prediction on whole periods (instead of half periods) the prediction gets rather independent of both even and odd harmonics.

Figure 8:
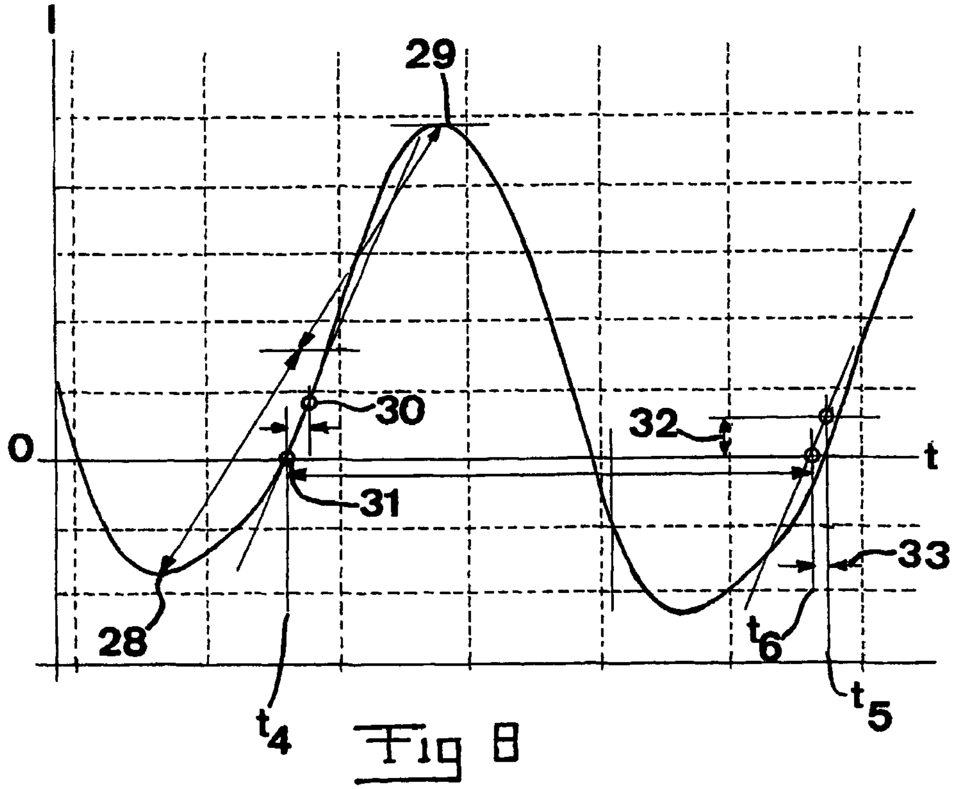
FIG. 8 illustrates schematically how a method for predicting zero-crossings according to a second preferred embodiment of the invention is carried out.

It is illustrated in FIG. 8 how the dc-level and the dc-decay of the alternating current may be considered in said prediction. The arrangement 19 is adapted to deliver a value of the dc-level at the time $t_4$ on the basis of the current detecting signals by forming an average of two consecutive peak values 28, 29 of the alternating current.

The differential coefficient of the alternating current at a zero-crossing detected is further calculated by measuring the current at two times close to the zero-crossing at $t_4$ and divide the difference in current level between these with the time, as shown through the points 30 and 31. The reading of the current then always takes place on the side of current zero on which the long half wave of the alternating current is located, i.e. on the side with a positive dc-addition. For determining the dc-decay of the alternating current the alternating current is integrated over a first and a consecutive (possibly with a certain overlap) time period being just as long as the first one, which each is substantially a period of the alternating current, and the quotient of these two current integration values is then formed for utilising 0them when calculating the dc-decay.

The following formula is preferably used for predicting a future zero-crossing:

$$t_{pred}=t_m+T+dc\times(1-d^2)/s$$

In which these stand for the following:

$t_{pred}$ predicted time for zero-crossing $t_m$ registered time for zero-crossing T period of time of the alternating current dc dc-level at the time $t_m$ d dc-decay (the part that remains after half a period)

$1-d^2$ how large the part is that disappears over a period s the current differential coefficient at zero-crossing (before or after current zero depending upon the sign of dc)

d is the value obtained through integration of the current during one period and forming the quotient with the integration made during a preceding period being just as long. s is the current differential coefficient which may be determined by reading the current value a certain period of time (for example 1 ms) before or after a zero-crossing. It appears in FIG. 8 how a time t6 predicted for the zero-crossing is first obtained, but how this is corrected to t5 through considering the term 32, which is $dc(1-d^2)$. This is made by introducing a time correction 33 that is 32/s=t6–t5.

According to another preferred embodiment of the invention a whole period of the current is stored in a buffer memory. The dc-level and the decay thereof are continuously calculated through integration of the buffer memory. A period of the current may at each time be predicted through assuming that the current gets the same as it was a period backwardly in the time minus the current dc-decay.

The prediction according to the invention gets a high accuracy, and it is particularly well suited for a multiple phase alternating current with a separately controllable switching device arranged in the current path for the respective phase, since a breaking of the different phases may take place at times suitable for each phase.

Figure 9:
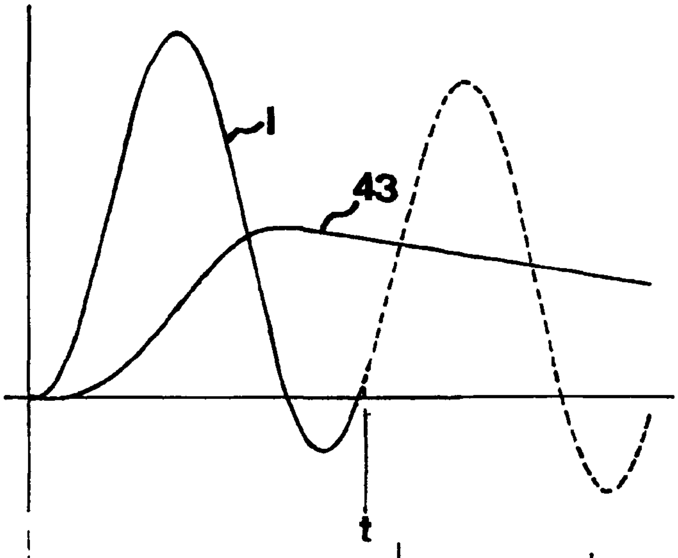
FIGS. 9 and 10 illustrates schematically how methods for predicting zero-crossings according to third and fourth, respectively, preferred embodiments of the invention are carried out.

A method for predicting a future zero-crossing according to another preferred embodiment of the invention will now be explained with reference to FIG. 9. This method is based on the fact that at least one period of the current as of the occurrence of a fault current is sampled and stored in a memory member. The curve 43 shows the dc-level of the current calculated through integration, and this is calculated at a time t, which here is the time for prediction, by forming the average of the current values stored in said memory member for the time period one current period backwardly from said time and recursively with so called "rolling average"-filter, which means that the oldest sample value is all the time removed and a new one is added. For the time t it is obtained for $i_{dc}^*$:

$$I_{dc}^*(t)=i_{dc}^*(t-1)+(i_{mesu}(t)-i_{mesu}(t-T))/T$$

T is the number of samples of a current period.

It is also assumed that the decay of the dc-level is exponential and the time constant τ is calculated by dividing the dc-level obtained through the division by the time differential coefficient thereof according to $$\tau=-i_{dc}^*(t)/(di_{dc}^*(t)/dt)$$

the dc-level of the current may by this be calculated at an arbitrary time, so that this for the sample t+t1 gets:

$$i_{dc}(t+t\mathbf{1})=i_{dc}(t)*exp(-t\mathbf{1}/\tau)$$

The current at the sample t+t1 may by means of this be predicted according to:

$$i_{pred}(t+t\mathbf{1})=i_{mesu}(t+t\mathbf{1}-T)-(i_{dc}(t+t\mathbf{1}-T)-i_{dc}(t+t\mathbf{1}))$$

Thus, a value of the alternating current in a future time is predicted by subtracting from the value of the current measured a current period before the time last mentioned the difference between the dc-level calculated a current period before the future time and the predicted dc-level of the current at said future time. By means of the predicted current future zero-crossings may be searched by means of for example the method of halve an interval.

Figure 10:
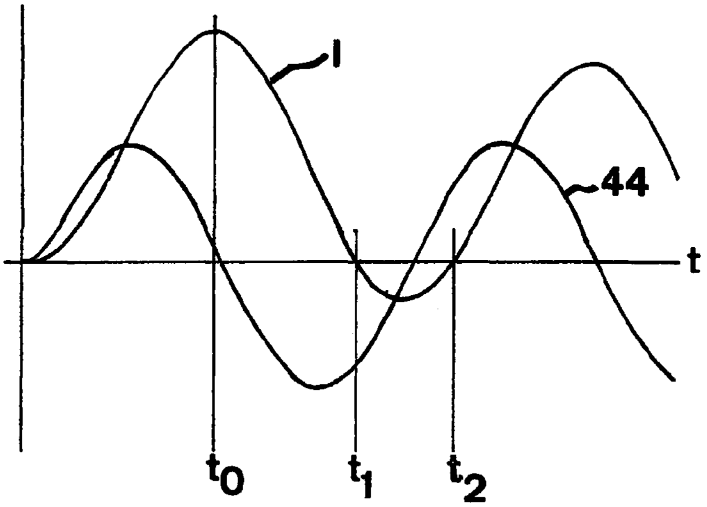

It is schematically illustrated in FIG. 10 how a future zero-crossing may be predicted according to a method according to another preferred embodiment of the invention. This method is of the type "quick", since it is only required that the detecting member detects the current during ¼0 time period. This method is based on the detection of the time t0 for a peak value of the alternating current and using it as reference for predicting a future zero-crossing of the alternating current. It is then valid for the prediction of the two zero-crossings following next thereupon at t1 and t2 that the following formulas are used:

$$t\mathbf{1}_{pred}=t\mathbf{0}+T/\mathbf{4}+korr\mathbf{1}$$

$$t\mathbf{2}_{pred}=t\mathbf{1}_{pred}+T/\mathbf{2}+korr\mathbf{2}$$

Korr1 and korr2 are calculated by means of the quotient of the maximum current (imax) and the maximum differential coefficient (dimax) during the last half period according to FIG. 10 as well as the decay with time of the dc-level:

$$korr\mathbf{1}=Ad(\mathbf{1}-i\max/di\max)$$

$$korr\mathbf{2}=Bkorr\mathbf{1}d,$$

in which A, B are constants, and dimax the peak value of the standardised differential coefficient 44 the half period directly before, in which the standardisation is such as for a pure sine function imax=dimax. d is the part of the dc-level remaining after half a period.

Figure 11:
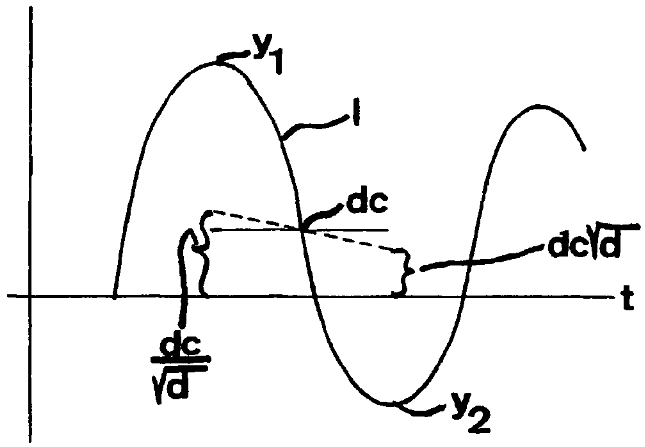
FIG. 11 illustrates how the dc-decay of the current may be rapidly calculated upon occurrence of faults of a three phase alternating current feeding.

It is finally schematically illustrated in FIG. 11 how the decay of the dc-level with time is calculated for a three phase alternating current. The dc-level is calculated for two phases r, s through average determination of two consecutive current peaks 45, 46 of the respective phase. The decay of the dc-level with time is calculated on the basis on the relation between these two dc-levels, and it is then used when predicting a zero-crossing of the alternating current. More exactly, the following system of equations may be written:

$$y\mathbf{1}r-y\mathbf{2}r-dcr(1/\sqrt{d}-\sqrt{d})=2\ y\max$$

$$y\mathbf{1}s-y\mathbf{2}s-dcr(1/\sqrt{d}-\sqrt{d})=2\ y\max$$

where d indicates how great part of the dc-level remains after ½ current period, and 2ymax is the distance between two consecutive current peaks in absence of dc-decay. d may be cancelled out from this equation system and by that the dc-decay be calculated.

The decay of the dc-level with time may be calculated in the corresponding way upon occurrence of a fault current in a one phase alternating current by determining the value of the alternating current of three consecutive current peaks through said current detection, and by then writing a corresponding equation system with a comparison of the first two current peaks in the first equation and the second and third current peak in the second equation.

By the fact that the method according to the invention for predicting a zero-crossing of the alternating current allows a large content of harmonics a very accurate prediction may be made also upon for example a one or two phase short circuiting of a generator or when the fault location contains an arc. The apparatus according to the invention is advantageously used for predicting a zero-crossing of the alternating current in a current path in a switch gear for electricity supply within industry or in distributions or transmission networks, and the prediction preferably takes place for an alternating current in a current path having a voltage on intermediate voltage level, i.e. between 1–52 kV. However, the invention is not restricted to alternating voltages on these levels.

Furthermore, the invention is particularly applicable to prediction of a zero-crossing of an alternating current in the current path through an electric switching device adapted to take an operation current of 1 kA, preferably at least 2 kA.

The invention is of course not in any way restricted to the preferred embodiments described above, but many possibilities to modifications thereof would be apparent to a person with ordinary skill in the art without departing from the basic idea of the invention as defined in the appended claims.

The invention is as already mentioned applicable to all types of electric switching devices.

What is claimed is:

1. A method for predicting a zero-crossing of an alternating current after occurrence of a fault current in a current path, and for determining a suitable time for opening an electric switching device arranged in the current path for breaking the current in, therein comprising the steps of:

detecting the alternating current;

calculating on the basis of the values of the alternating current detection the dc-level of the current corresponding to the displacement of the symmetry line of the alternating current with respect to the zero level thereof, and the decay over time of the dc-level;

predicting a time for a future zero-crossing of the alternating current on the basis of at least the current values obtained through said current detection, the calculated dc-level, the calculated dc-decay and the period time of the alternating current.

2. A method according to claim 1, further comprising the steps of the time for a zero-crossing of the current during said current detection and considering the time for the detected zero-crossing when predicting a time for a future zero-crossing of the alternating current.

3. A method according to claim 1, further comprising the steps of: wherein said detection of the alternating current after occurrence of said fault current is carried out during a period of time of at least one period of the alternating current and current values resulting from detection of the alternating current during this period of time are used for calculating said dc-decay.

4. A method according to claim 3, further comprising the steps of predicting zero-crossings within a period of the alternating current following upon said.

5. A method according to claim 1, further comprising the step of detecting the time for at least two zero-crossings of the current; and; predicting a future zero-crossing using the data.

6. A method according to claim 1, further comprising the steps of:

integrating the alternating current over a first and a consecutive second equal periods of time being substantially a period of the alternating current, and Calculating said dc-decay using the quotient of the two current integration values.

7. A method according to claim 2, comprising the steps of:

calculating the differential coefficient of the alternating current at a zero-crossing on the basis of said current detection differential coefficient value for calculating a future zero-crossing of the alternating current.

8. A method according to claim 7, further comprising the step of determining said differential coefficient on the basis of values of the alternating current detected immediately before and closely after said zero-crossing.

9. A method according to claim 1, further comprising the steps of:

determining the value of the alternating current for two consecutive current peaks through said current detection;

forming an average of the two current values; and considering said dc-level in the prediction.

10. A method according to claim 9, in which the alternating current is a three-phase alternating current, further comprising the steps of:

calculating the dc-level for two phases through formation of an average of two consecutive current peaks of the respective phase;

calculating the decay of the dc-level with time on the basis of the relation between the two dc-levels; and using the dc-levels in said prediction.

11. A method according to claim 9, in which the alternating current is a one-phase alternating current, further comprising the steps of:

determining the value of the alternating current of a third current peak following upon said two current peaks through said current detection;

forming an average is of the current value of the third and the prior current peak for calculating a second dc-level' calculating the decay of the dc-level with time on the basis of the relation between the two dc-levels' and using the decay in the prediction.

12. A method according to claim 6, further comprising the steps of:

predicting the time for a future zero-crossing by adding the time for the detected zero-crossing by the period time of the alternating current and dividing term the dc-level at the time for the zero-crossing detected by said differential coefficient and multiplying the term (1−d2), in which d is said quotient.

13. A method according to claim 1, wherein the ac-decay of the alternating current, such as the decrease of the amplitude of the alternating current with time.

14. A method according to claim 1, further comprising the steps of storing in a memory the value of the alternating current during at least a whole current period, the dc-level and the dc-decay being calculated continuously through integration of the memory, and predicting said zero-crossing of the current by calculating said current value one period in advance for each time through the value prevailing at said each time minus the existing dc-decay.

15. A method according to claim 1, further comprising the steps of:

sampling the value of the alternating current with a sampling frequency during at least an entire current period;

storing the values sampled in a memory member' calculating the dc-level at a given time by forming an average of the current values stored for the period of time one current period before said time; and using the dc-level in predicting a future zero-crossing of the alternating current.

16. A method according to claim 15, further comprising the steps of:

assuming an exponential decay of the dc-level; and calculating the time constant by dividing the dc-level by the time differential coefficient thereof.

17. A method according to claim 15, wherein the dc-level at a future time is predicted on the basis of the dc-level calculated for said given time and the decay of the dc-level with time, and a value of the alternating current at said future time is predicted by subtracting from the value of the current measured one current period before the time last mentioned the difference between the calculated dc-level one current period before the future time and the predicted dc-level of the current at said future time.

18. A method according to claim 17, wherein the method of half an interval is used for seeking future zero-crossings of the current by means of said predicted value of the alternating current.

19. A method according to claim 1, wherein the time for a peak value of the alternating current is detected and is used as a reference for predicting future zero-crossings of the alternating current.

20. A method according to claim 19, wherein the time for the zero-crossing of the alternating current following next upon said peak value is predicted by adding ¼ of a current period and a first correction factor to the peak value time, and that the correction factor is formed by a product $$d \cdot \left(1 - \frac{7\mathrm{max}}{d7max}\right),$$

in which d is a constant and is the part of the dc-level that remains after half a current period, imax said peak value of the current and dimax the peak value of a standardised differential coefficient of the current during the half period just before the time for the peak value of the current, in which the standardisation is so selected that imax and dimax get the same numerical values when the current is a pure sine function.

21. A method according to claim 20, further comprising the steps of:

predicting the time for the zero-crossing following said current peak value by adding ½ of a current period and a second correction factor to the time for the predicted zero-crossing immediately following said peak value;

and forming the second correction factor is formed by a product of the first correction factor da and a constant.

22. A method according to claim 1, wherein the alternating current detected is subjected to an analog/digital conversion before said calculations.

23. A method according to claim 22, wherein filtering of the detected current signal occurs before said conversion for filtering out high frequency noise signals.

24. A method according to claim 1, wherein prediction of the zero-crossing of the alternating current is carried out for an electric switching device comprising first and second branches connected in parallel in the current path, the first branch comprises a first contact member having two contacts movable with respect to each other fort opening and closing, and the second branch comprises a part for blocking current therethrough in a blocking direction and for conducting current therethrough in at least one direction, a second contact member having two contacts movable with respect to each other for opening and closing being connected in series with said part;

the switching device comprising a unit adapted to control opening of said current path on the basis of said prediction by controlling the first contact member to open for transferring the current to said device when in or going into a conducting state and the second contact member to open when said part is in a state of blocking current therethrough for breaking the current through the switching device.

25. A method according to claim 1, comprising:

an electric switching device for detecting the zero-crossing of the alternating current including:

at least two contact members arranged in a current path through the switching device; a semiconductor device for blocking current therethrough in at least a first blocking direction and a unit adapted to control opening of a current path through the switching device by controlling the first one of the contact members to open for transferring the current through the semiconductor device when this is in or going into a conducting state; the second contact member to open when the semiconductor device is in a state of blocking current therethrough for making the breaking of the current through the switching device permanent, the current path has two branches connected in parallel between the first and the second end of the switching device and cross-connected to each other through the semiconductor device, the direction and the magnitude of the current through the switching device are detected such that for breaking of the current in the current path through the switching device first both branches are opened, one before as seen from said first end and the other after as seen from said first end the connection of the respective branch to the semiconductor device, the first and second branches being first opened being dependent upon the detection of the current, the current being transferred to a temporary current path between said two ends through a part of one branch, the semiconductor device and a part of the other branch when the semiconductor device is in or going into a conducting state; and the breaking of the current through the switching device is made permanent when the semiconductor device is in a state of blocking current therethrough by opening said temporary current path, and the opening of the current path and the breaking of the current therein is controlled on the basis of said prediction of a zero-crossing of the current.

26. A method according to claim 1, wherein the alternating current is a multiple phase alternating current and a separately controllable electric switching device is arranged in said current path for the respective phase, and said future zero-crossing of the alternating current being predicted individually for each phase of the alternating current for individually determining for each switching device a suitable time for opening exactly that switching device and breaking the current therethrough.

27. An apparatus for predicting a zero-crossing of an alternating current after occurrence of a fault current in a current path for determining a suitable time for opening an electric switching device arranged in the current path for breaking the current in the current path, comprising:

members adapted to detect the current in the current path, including an arrangement adapted to calculate the dc-level of the current, such as, and the decay of the dc-level with the time on the basis of values of the alternating current detected by said members, said arrangement being adapted to predict the time for a future zero-crossing of the alternating current on the basis of at least the current values obtained through said current detection, the calculated dc-level, the calculated dc-decay and information about the period time of the alternating current.

28. An apparatus according to claim 27, wherein said members are adapted to detect the time for a zero-crossing of the current, the arrangement being adapted to consider the time for a detected zero-crossing when predicting a time for a future zero-crossing of the alternating current.

29. An apparatus according to claim 27 wherein said members are adapted to detect the alternating current after occurrence of said fault current during a period of time of at least one period of the alternating current, and the arrangement is adapted to use current values resulting from detection of the alternating current during the period of time for calculating said dc-decay.

30. An apparatus according to claim 29, wherein said arrangement is adapted to calculate zero-crossings of the alternating current within the period of the alternating current following said at least one period.

31. An apparatus according to claim 27, wherein said members are adapted to detect the time for at least two zero-crossings of the alternating current, and wherein the arrangement is adapted to use data about the two zero-crossings for calculating the time for a future zero-crossing.

32. An apparatus according to claim 27, further comprising means adapted to integrate the alternating current detected by said members over a first and second equal periods of time, as the first being substantially a period of the alternating current, said arrangement being adapted to form the quotient of the two current integration values and utilise the quotient and for calculating said dc-decay.

33. An apparatus according to claim 28, comprising members adapted to calculate the differential coefficient of the alternating current of the zero-crossing detected through information received from said current detection members, the arrangement being adapted to use this differential coefficient value when calculating a future zero-crossing of the alternating current.

34. An apparatus according to claim 33, wherein said members for calculating the differential coefficient are adapted to determine the differential coefficient on the basis of values of the alternating current detected immediately before and after said zero-crossing.

35. An apparatus according to claim 27, wherein said current detection members are adapted to deliver the value of the alternating current of two consecutive current peaks to said arrangement, the arrangement being adapted to form an average of the two current values for use as said dc-level when calculating said future zero-crossing of the alternating current.

36. An apparatus according to claim 35, in which the alternating current is a three phase alternating current, and the arrangement is adapted to calculate the dc-level for two phases by determining an average of two consecutive current peaks (y1, y2) of the respective phase, the arrangement being adapted to calculate the decay with time of the dc-level on the basis of the relation between the two dc-levels and thereafter using the decay for predicting a future zero-crossing.

37. An apparatus according to claim 35, in which the alternating current is a one phase alternating current, said current detection members being adapted to deliver the value of the alternating current of a third current peak following said two current, the arrangement being adapted to form an average of the current value of the third and the current peak just before the one for calculating a second dc-level, and the arrangement further adapted to calculate the decay with time of the dc-level on the basis of the relation between the two dc-levels and thereafter then use the decay predicting a future zero-crossing.

38. An apparatus according to claim 32, wherein said arrangement is adapted to calculate the time for a future zero-crossing by adding the time for the zero-crossing detected by the period time of the alternating current and the dc-level at the time for the zero-crossing divided by said differential coefficient and multiplied by (1−d2), in which d is said quotient.

39. An apparatus according to claim 27, comprising members adapted to calculate the ac-decay of the alternating current, on the basis of current values delivered by said current detecting members.

40. An apparatus according to claim 27, comprising a memory member adapted to store values of the alternating current detected by the current detecting members for at least an entire current period, the arrangement being adapted to continuously calculate the dc-level and the dc-decay by integrating current data stored by the memory member, and the arrangement is being further adapted to calculate said zero-crossing of the current by calculating the value of the current for each time period in advance of the value prevailing at said time minus the existing dc-decay.

41. An apparatus according to claim 27, wherein the detecting members are adapted to sample the value of the alternating current with a sampling frequency during at least an entire current period and a memory member is adapted to store the values sampled, the arrangement being adapted to calculate the dc-level at a given time by forming the average of the current values stored for the period of time of a current period prior to said time and thereafter use the dc-level when predicting a future zero-crossing of the alternating current.

42. An apparatus according to claim 41, wherein the decay of the dc-level is assume to be exponential and the time constant of the decay is determined by dividing the dc-level obtained through said division by the time differential coefficient thereof.

43. An apparatus according to claim 41, wherein the arrangement is adapted to predict the dc-level at a future time on the basis of the dc-level and the decay of the dc-level with the time calculated for said given time, and the arrangement is further adapted to predict the value of the alternating current by subtracting from the value of the alternating current measured a current period before the given time the difference between the calculated dc-level a current period before the future time and the predicted dc-level of the current at said future time.

44. An apparatus according to claim 43, wherein the arrangement is adapted to u of halve an interval for searching future zero-crossings of the alternating current by means of said predicted value of the alternating current.

45. An apparatus according to claim 27, wherein the detecting members are adapted to detect the time for a peak value of the alternating current, and the arrangement is adapted to use the time as a reference for predicting future zero-crossings of the alternating current.

46. An apparatus according to claim 45, wherein the arrangement is adapted to predict the time for the zero-crossing of the alternating current following next upon said peak value by adding ¼ of a current period and a first correction factor to the peak value time, and that it is adapted to form said correction factor by a product:

$$d\cdot\left(1-\frac{7max}{d7max}\right),$$

in which d is a constant and is the part of the dc-level that remains after half a current period, imax is said peak value of the current and dimax is the peak value of a standardised differential coefficient of the current during the half period directly before the time for the peak value of the current, and in which the standardisation is selected so that imax and dimax have the same numerical values when the current is a pure sine function.

47. An apparatus according to claim 46, wherein the arrangement is adapted to predict the time for the zero-crossing following secondly upon said current peak value by adding ½ of a current period and a second correction factor to the predicted zero-crossing following next upon said peak value, and in which the arrangement is adapted to form the second correction factor by a product of the first correction factor, d and a constant.

48. An apparatus according to claim 27, comprising an analog/digital converter adapted to convert current value signals emanating from the current detecting member into digital form.

49. An apparatus according to claim 48, comprising members for frequency filtering of detected current signals coming from the current detecting member both before and after said conversion for filtering noise signals from the current signals.

50. An apparatus according to claims 27, being adapted to carry out a prediction of the zero-crossing of the alternating current in an electric switching device comprising:

two branches connected in parallel in the current path, the first branch comprises a first contact member having two contacts movable with respect to each other for opening and closing; and the second branch comprises a part for blocking current therethrough in at least a blocking direction and for conducting current therethrough in at least one direction, wherein a second contact member having two contacts movable with respect to each other for opening and closing is connected in series with said part, and wherein the switching device also comprises a unit adapted to control opening of said current path on the basis of said prediction by controlling the first contact member to open for transferring the current to said part when it is in or is going into a conducting state and to then open the second contact member when said part is in a state of blocking current therethrough for breaking the current through the switching device.

51. An apparatus according to claim 1, being adapted to carry out a prediction of the zero-crossing of the alternating current in an electric switching device comprising:

at least two contact members arranged in the current path through the switching device; and a semiconductor device with ability to block current therethrough in at least a first blocking direction; and a unit adapted to control the breaking of a current in a current path through the switching device by controlling a first of contact member to open for transferring the current through the switching device to the semiconductor device when it is in or is going into a conducting state and to open a second contact member when the semiconductor device is in the state of blocking current therethrough for making the breaking of the current through the switching device permanent, and wherein the total number of contact members of the switching device is at least four with two connected in series in each of two branches connected in parallel in said current path, the semiconductor device being adapted to connect midpoints between two contact members of each branch with each other, the switching device comprising:

at least one member adapted to detect the direction of the current through the switching device, the control unit being adapted to control the breaking of the current in the current path by controlling a first contact member of one, first branch located before said midpoint as seen in the prevailing current direction to open, and a second contact member of the second branch located after the midpoint as seen in the current direction to open for transferring the current to a temporary current path through the semiconductor device when it is in or is going into the conducting state, and thereafter making the breaking of the current in the current path through the switching device permanent when the semiconductor device is in a state of blocking current therethrough through opening at least one contact member of the switching device arranged in the temporary current path through the semiconductor device, and the control unit is adapted to select which branch shall be the first one on the basis of information from the current detecting member and control the breaking of the current in the current path in dependence on the result of the prediction of said zero-crossing of the alternating current.

52. An apparatus according to claim 27, wherein the alternating current is a multiple phase alternating current and a separately controllable electric switching device is arranged in said current path for each phase, wherein said arrangement is adapted to calculate said future zero-crossing of the alternating current individually for each phase of the alternating current and for each switching device determining a suitable time for opening thereof.

53. An apparatus according to claim 27, comprising means adapted to cooperate with an electrically controlled driving member to open the electric switching device.

54. An apparatus according to claim 53, wherein the driving member is an electromagnetic machine.

55. An apparatus according to claim 54, wherein the driving member is an electric motor.

56. An apparatus according to claim 53, wherein said means for cooperating comprises a control unit in the form of an electronic unit adapted to control said driving member.

57. An apparatus according to claim 27 for predicting a zero-crossing of an alternating current in a current path in electrical networks.

58. An apparatus according to claim 27 for predicting a zero-crossing of a current in a current path having a voltage between 1 kV and 52 kV.

59. An apparatus according to claim 27 for predicting a zero-crossing of an alternating current in a current path through an electric switching device adapted to take an operation current of at least 1 kA.

60. An apparatus according to claim 27 for predicting a zero-crossing of an alternating current in a current path connected to a generator.

61. An arrangement for predicting a zero-crossing of an alternating current after occurrence of a fault current in a current path for determining a suitable time for opening an electric switching device arranged in the current path for breaking the current in the current path, comprising:

a program module including a processor adapted to carry out program instructions to detect the current in the current path, to calculate the dc-level of the current represented by the displacement of the symmetry line of the alternating current with respect to the zero level thereof, and the decay of the dc-level with the time on the basis of detected values of the alternating current, and to predict a time for a future zero-crossing of the alternating current on the basis of at least current values obtained through said current detection, the dc-level calculated, the dc-decay calculated and the period time of the alternating current.

62. A computer program in combination with and embodied in a computer readable medium for carrying out a method of predicting a zero-crossing of an alternating current after occurrence of a fault current in a current path for determining a suitable time for opening an electric switching device arranged in the current path for breaking the current in the current path, comprising:

instructions for influencing a processor to cause detection of the current in the current path, calculating of the dc-level of the current represented by the displacement of the symmetry line of the alternating current with respect to the zero level thereof, and the decay of the dc-level with the time on the basis of detected values of the alternating current, and predicting a time for a future zero-crossing of the alternating current on the basis of at least the current values obtained through said current detection, the dc-level calculated, the dc-decay calculated and the period time of the alternating current.

63. A computer program according to claim 62 operable through a network.

64. A computer program in combination with and embodied in a computer readable medium for carrying out the method of claim 1, being loaded directly into an internal memory of a digital computer and including software code portions when run on said computer.

* * * * *